United States Patent
Soininen et al.

(10) Patent No.: US 9,642,177 B2
(45) Date of Patent: May 2, 2017

(54) METHOD FOR ESTABLISHING A CONNECTION BETWEEN A TERMINAL OF A FIRST TYPE AND A CORE NETWORK OF A SECOND TYPE IN A TELECOMMUNICATIONS NETWORK

(75) Inventors: Jonne Soininen, Mountain View, CA (US); Sami Uskela, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 728 days.

(21) Appl. No.: 10/330,240

(22) Filed: Dec. 30, 2002

(65) Prior Publication Data
US 2003/0152048 A1    Aug. 14, 2003

(30) Foreign Application Priority Data

Jun. 29, 2000   (FI) ...................................... 20001544

(51) Int. Cl.
*H04W 76/02*   (2009.01)

(52) U.S. Cl.
CPC ................................ *H04W 76/026* (2013.01)

(58) Field of Classification Search
None
See application file for complete search history.

(56) References Cited

U.S. PATENT DOCUMENTS

| | | | |
|---|---|---|---|
| 5,528,664 A | 6/1996 | Slekys et al. | |
| 5,729,534 A | 3/1998 | Jokinen et al. | |
| 6,219,346 B1* | 4/2001 | Maxemchuk | 370/338 |
| 6,363,253 B1* | 3/2002 | Valentine et al. | 455/445 |
| 6,374,112 B1* | 4/2002 | Widegren et al. | 455/452.2 |
| 6,463,055 B1* | 10/2002 | Lupien et al. | 370/353 |
| 6,490,451 B1* | 12/2002 | Denman | H04W 88/14 370/338 |
| 6,496,690 B1* | 12/2002 | Cobo et al. | 455/408 |
| 6,608,832 B2* | 8/2003 | Forslow | 370/353 |
| 6,654,610 B1* | 11/2003 | Chen et al. | 455/450 |
| 6,678,526 B1* | 1/2004 | Sugirtharaj | 455/450 |
| 6,683,853 B1* | 1/2004 | Kannas et al. | 370/237 |

(Continued)

FOREIGN PATENT DOCUMENTS

| | | |
|---|---|---|
| EP | 0 883 324 | 12/1998 |
| FI | WO00/16576 | * 3/2000 |

(Continued)

OTHER PUBLICATIONS

Examination Report from corresponding European Patent Appl. No. 01951748.1, dated Jul. 2, 2010.

(Continued)

*Primary Examiner* — Mohammad Adhami
(74) *Attorney, Agent, or Firm* — Alston & Bird LLP

(57) ABSTRACT

A method for establishing a connection between a circuit-switched mobile station (MS) and a packet-switched switching element (MSC). A radio network controller (RNC) receives a first initiation signal (an attach request) from the mobile station (MS) via a circuit-switched connection. The RNC opens a signaling connection for the mobile station. While the signaling connection is active, the RNC receives a second initiation signal (call setup) and opens a real-time connection for the mobile station. Thus the packet-switched switching element (MSC) is able to switch a real-time connection to/from the circuit-switched mobile station (MS).

11 Claims, 3 Drawing Sheets

(56) References Cited

U.S. PATENT DOCUMENTS

| | | | |
|---|---|---|---|
| 6,724,748 B1* | 4/2004 | Stille et al. | 370/352 |
| 6,839,339 B1* | 1/2005 | Chuah | 370/349 |
| 6,985,446 B1* | 1/2006 | Hurtta et al. | 370/249 |
| 7,116,646 B1* | 10/2006 | Gustafson et al. | 370/313 |
| 7,336,649 B1* | 2/2008 | Huang | 370/352 |
| 2001/0031635 A1* | 10/2001 | Bharatia | 455/432 |
| 2002/0111173 A1* | 8/2002 | Hendrey et al. | 455/456 |
| 2002/0160775 A1* | 10/2002 | Pecen et al. | 455/434 |
| 2003/0039237 A1* | 2/2003 | Forslow | 370/352 |
| 2004/0058688 A1* | 3/2004 | Silver et al. | 455/456 |
| 2004/0131053 A1* | 7/2004 | Sjolund et al. | 370/356 |

FOREIGN PATENT DOCUMENTS

| | | | |
|---|---|---|---|
| FI | WO01/01718 | * | 1/2001 |
| WO | 00/01186 | | 1/2000 |
| WO | WO-00/21254 A2 | | 4/2000 |
| WO | WO0021310 | * | 4/2000 |
| WO | 00/41425 | | 7/2000 |
| WO | 00/56088 | | 9/2000 |
| WO | 00/64203 | | 10/2000 |
| WO | 00/64211 | | 10/2000 |

OTHER PUBLICATIONS

Office Action for corresponding European Patent Application No. 01951748.1 dated Jan. 30, 2017.

\* cited by examiner

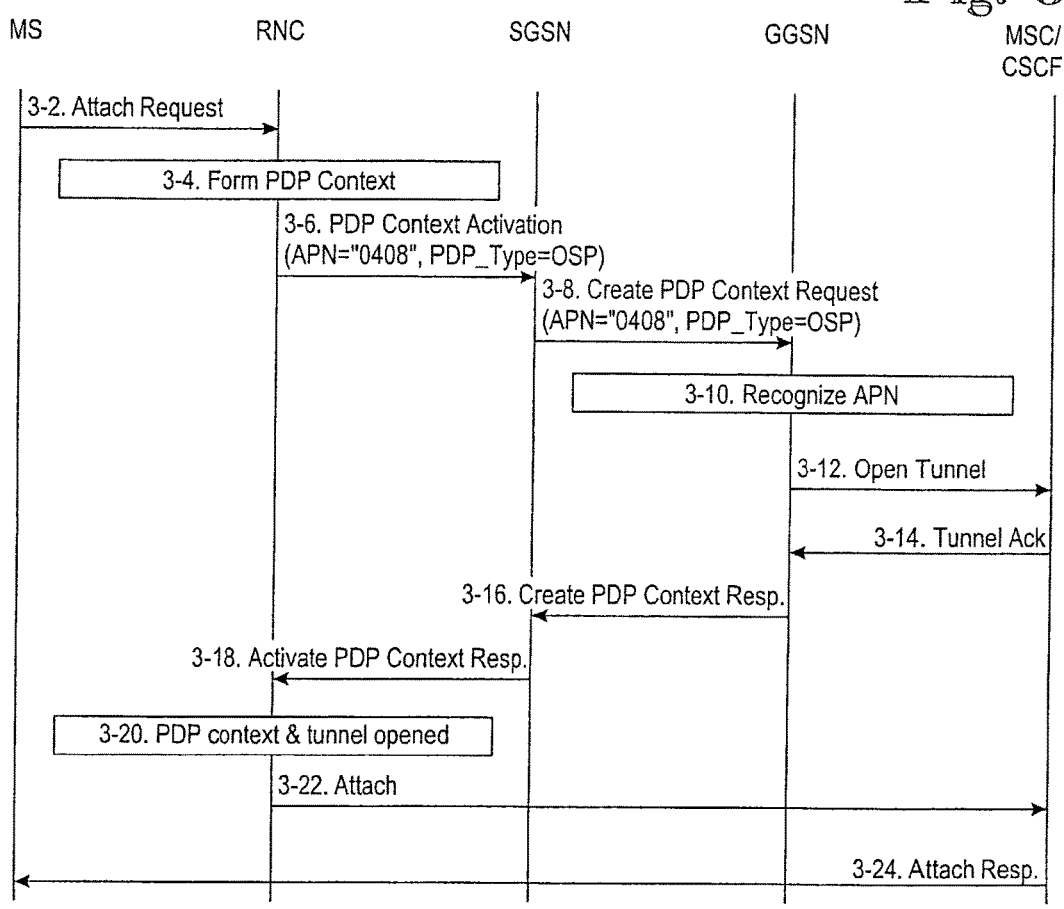

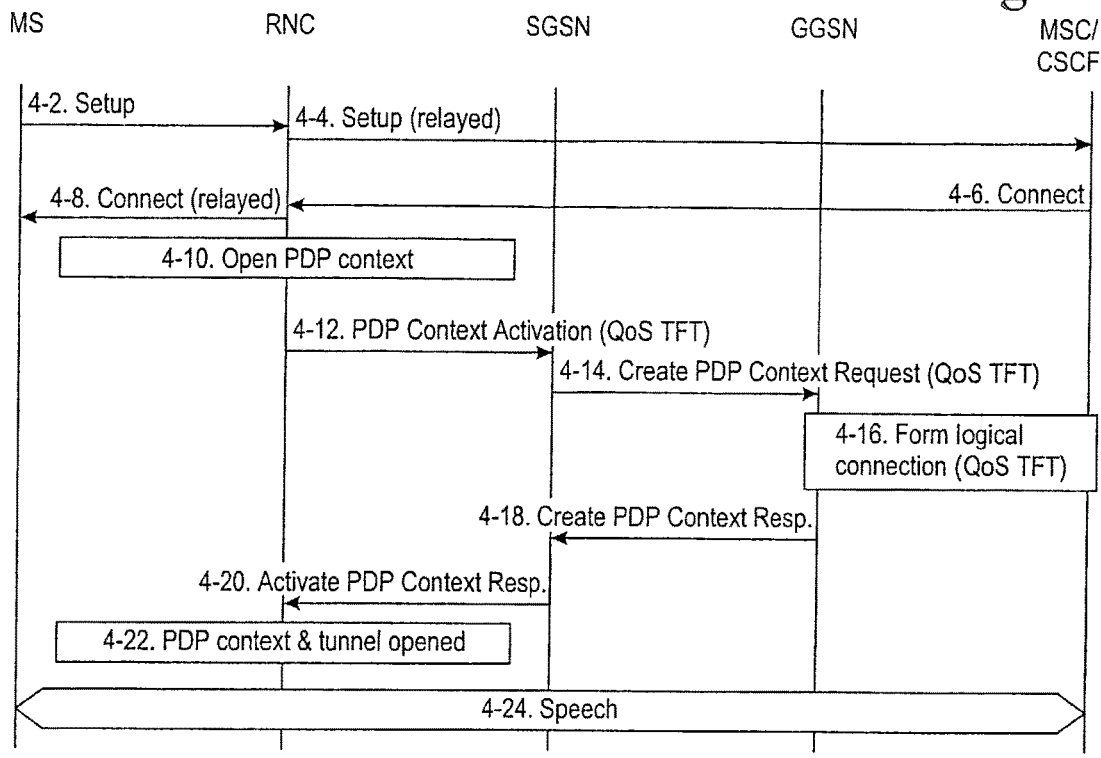
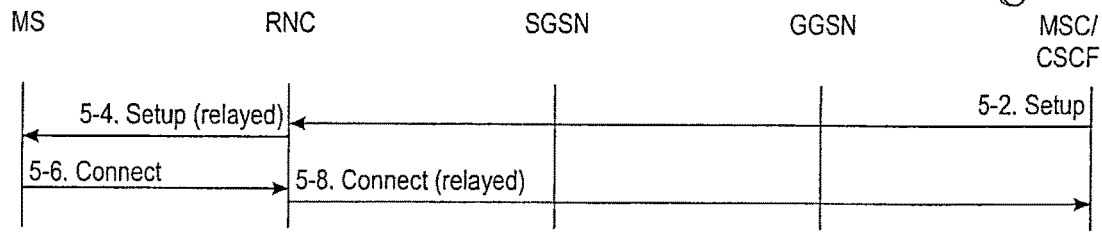
Continue at step 4-10 in Figure 4

METHOD FOR ESTABLISHING A CONNECTION BETWEEN A TERMINAL OF A FIRST TYPE AND A CORE NETWORK OF A SECOND TYPE IN A TELECOMMUNICATIONS NETWORK

CROSS REFERENCE TO RELATED APPLICATIONS

This application is a Continuation of International Application PCT/F101/00620 filed on Jun. 28, 2001, which designated the U.S. and was published under PCT Article 21(2) in English.

BACKGROUND OF THE INVENTION

Field of the Invention

The invention relates to methods and equipment for supporting a dissimilar terminal in a network, such as a circuit-switched terminal in a packet network or vice versa.

FIG. 1 is a block diagram of a telecommunications system showing the components which are essential for understanding the invention. A UMTS Mobile Station MS consists of Mobile Equipment ME and a USIM card (User and Services and Identity Module). There is a radio interface Uu between the MS and a Radio Access Network RAN which comprises Base Stations BS under control of Radio Network Controllers RNC. For circuit-switched services, the RNCs are connected to Mobile services Switching Centers MSC, and for packet-switched services, there is a connection to Serving GPRS Support Nodes SGSN (GPRS=General Packet Radio Service). The MSC and SGSN elements may include separate UMTS addition sections. Subscriber data related to the MS is stored permanently in a Home Location Register HLR and for circuit-switched operation, the data is transferred to the Visitor Location Register VLR of the MSC which currently serves the MS. For storing equipment-related data, the network comprises an Equipment Identity Register EIR. For entering and updating subscriber-specific data, there is an Operation and Maintenance O&M section having a Man-Machine Interface MMI. For creating and managing supplementary services, there is typically a dedicated Service Control Node SCN which can be seen as an evolved version of a Service Control Point (SCP) of Intelligent Networks.

Only the packet-switched section will be described in more detail, and it is assumed that this section will resemble a GPRS system. The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS mobile station, and keep a record of the location of the mobile stations inside its service area. The subscription information is stored in a GPRS register (HLR) where the mapping between a mobile's identity (such as MS-ISDN or IMSI) and the PSPDN address is stored. The GPRS register acts as a database from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP (Internet protocol) network (such as the Internet) or an X.25 network, and service centers. Fixed hosts 14 can be connected to a data network 11, e.g., by means of a local area network LAN and a router 15. A border gateway BG provides access to an inter-operator GPRS backbone network 12. The GGSN may also be connected directly to a private corporate network or a host. The GGSN includes GPRS subscribers' PDP (Packet Data Protocol) addresses and routing information, i.e., SGSN addresses. Routing information is used for tunneling protocol data units PDU from the data network 11 to the current switching point of the MS, i.e., to the serving SGSN. The functionalities of the SGSN and GGSN can be connected to the same physical node.

The home location register HLR of the GSM network contains GPRS subscriber data and routing information and it maps the subscriber's IMSI into an SGSN address and one or more pairs of the PDP type and PDP address. The HLR also maps each PDP type and PDP address pair into a GGSN node. The SGSN has a Gr interface to the HLR (a direct signaling connection or via an internal backbone network 13). The HLR of a roaming MS and its serving SGSN may be located in different mobile communication networks.

The intra-operator backbone network 13, which interconnects an operator's SGSN and GGSN equipment can be implemented, for example, by means of a local network, such as an IP network. An operator's GPRS network can also be implemented without the intra-operator backbone network, for example by providing all features in one computer.

A problem with the network architecture as shown in FIG. 1 is that a subscriber must have a UMTS handset in order to access UMTS services. A subscriber with a handset capable of only circuit-switched operation cannot use the services provided by a UMTS network. As a result, the RNC-to-MSC interface(s) must support both circuit-switched and packet-switched operation.

SUMMARY OF THE INVENTION

An object of the invention is to provide a mechanism for solving the problems mentioned above. This object is achieved with a method and equipment which are characterized by what is disclosed in the attached independent claims. Preferred embodiments of the invention are disclosed in the attached dependent claims.

The invention is based on the idea that a radio network controller (RNC) operates towards a mobile station as a circuit-switched RNC does. In other words, the RNC (or another radio network node, such as a base station) emulates a packet-switched mobile station to the uplink network, and it emulates a circuit-switched network/telephone exchange to the mobile station.

The emulator function can be implemented by means of the following steps:

1. The radio network controller (RNC) receives a first initiation signal from the mobile station via a circuit-switched connection. In response to the first initiation signal, the RNC opens a first PDP context (such as a signaling PDP context) for the mobile station.

2. The RNC receives a second initiation signal and uses the first PDP context to open a second PDP context (such as a real-time PDP context).

As a result, the packet-switched switching element, such as an MSC, is able to support real-time connections to/from the circuit-switched mobile station. As used here, a 'circuit-switched mobile station' means a mobile station that uses only circuit-switched protocols. Similarly, a 'packet-switched switching element' means a switching element (such as an MSC or MSC server) that uses packet-switched protocols.

In response to the first initiation signal, the RNC requests the GGSN to open a first PDP context for the mobile station. The first initiation signal is preferably an attach request from the mobile station, and the first PDP context for the mobile station is preferably a signaling PDP context. This means that the signaling PDP context is maintained as long as the mobile station is attached to the network. A signaling PDP context is a context which is used to carry application signaling between the mobile station and network elements outside the packet-switched network, i.e., beyond the Gi interface, transparently to the network.

The second initiation signal is preferably a request to establish a call (a voice, data, fax or video call) to/from the mobile station, and the second PDP context is a real-time context. A real-time context is a context which is used to carry real-time data, such as calls. This means that the real-time context is maintained only for the duration of an active call.

As an alternative, the first and the second initiation signals can be the same, i.e., the request for call setup. In other words, both PDP contexts are created only for the duration of an active call. Because the GGSN only has to maintain a context for mobile stations having an active call, this embodiment saves some memory in the GGSN. Call establishment is slower, however, because two contexts have to be created.

Thus, as soon as the RNC receives a call request, it automatically opens a real-time PDP context for the mobile station. The PDP context is opened to a GGSN node with a connection to a Call State Control Function (CSCF) or an MSC server. An MSC server is an MSC acting on top of an IP protocol stack (an MSC plus an interworking function, IWF), or in other words, an MSC which understands the IP protocol. Then a tunnel is established between the mobile station and the CSCF or the MSC server, based on an OSP PDP context or a special PDP context. The OSP (Octet Stream Protocol) PDP context is based on ETSI recommendations. The term "special PDP context", as used here, refers to a PDP context which is specially optimized for circuit-switched services). The circuit-switched data to/from the mobile station is carried via this tunnel. The special PDP context is used to carry GSM 04.08 or UMTS 24.008 mobile radio interface layer 3 signaling (call control and mobility management) from the RNC to the GGSN which forms an access point. The access point is such that from it a tunnel can be opened towards the IWF associated with the MSC. The mobile radio interface layer 3 signaling comprises, for example, call-related signaling (such as call setup, control and release) and mobility management-related signaling (such as location updating, attach and detach operations). The signaling messages are encapsulated into data packets.

After the signaling PDP context has been established and the call setup signaling has been carried to the IWF and MSC, a user data bearer can be allocated between the RNC and the MSC/IWF.

The signaling PDP context and the tunnel can be created in response to an MS-initiated attach procedure or a call setup from the mobile station. Establishing the tunnel in connection with an attach procedure is the preferred course of action because the tunnel can be used for mobile-terminated calls as well. Call establishment is faster and easier if the signaling PDP context has been opened beforehand. Some memory is wasted by maintaining the PDP context continuously (versus maintaining the PDP context only during a call) but the memory waste can be kept to a minimum by making use of the PDP context which is specially optimized for circuit-switched services, as stated above.

The invention can also be used in the reverse direction, that is, for establishing a connection between a packet-switched mobile station (or other terminal) and a circuit-switched exchange (or other switching element).

BRIEF DESCRIPTION OF THE DRAWINGS

The invention will be described in more detail by means of preferred embodiments with reference to the appended drawing wherein:

FIG. 3 is a signaling diagram illustrating a procedure for opening a signaling PDP context in response to a mobile station's attach procedure;

FIG. 4 is a signaling diagram illustrating a procedure for opening a real-time PDP context in response to a mobile-originated call request; and FIG. 5 is a signaling diagram illustrating a procedure for opening a real-time PDP context in response to a mobile-terminated call request.

DETAILED DESCRIPTION OF THE PREFERRED EMBODIMENT(S)

Figure 1:
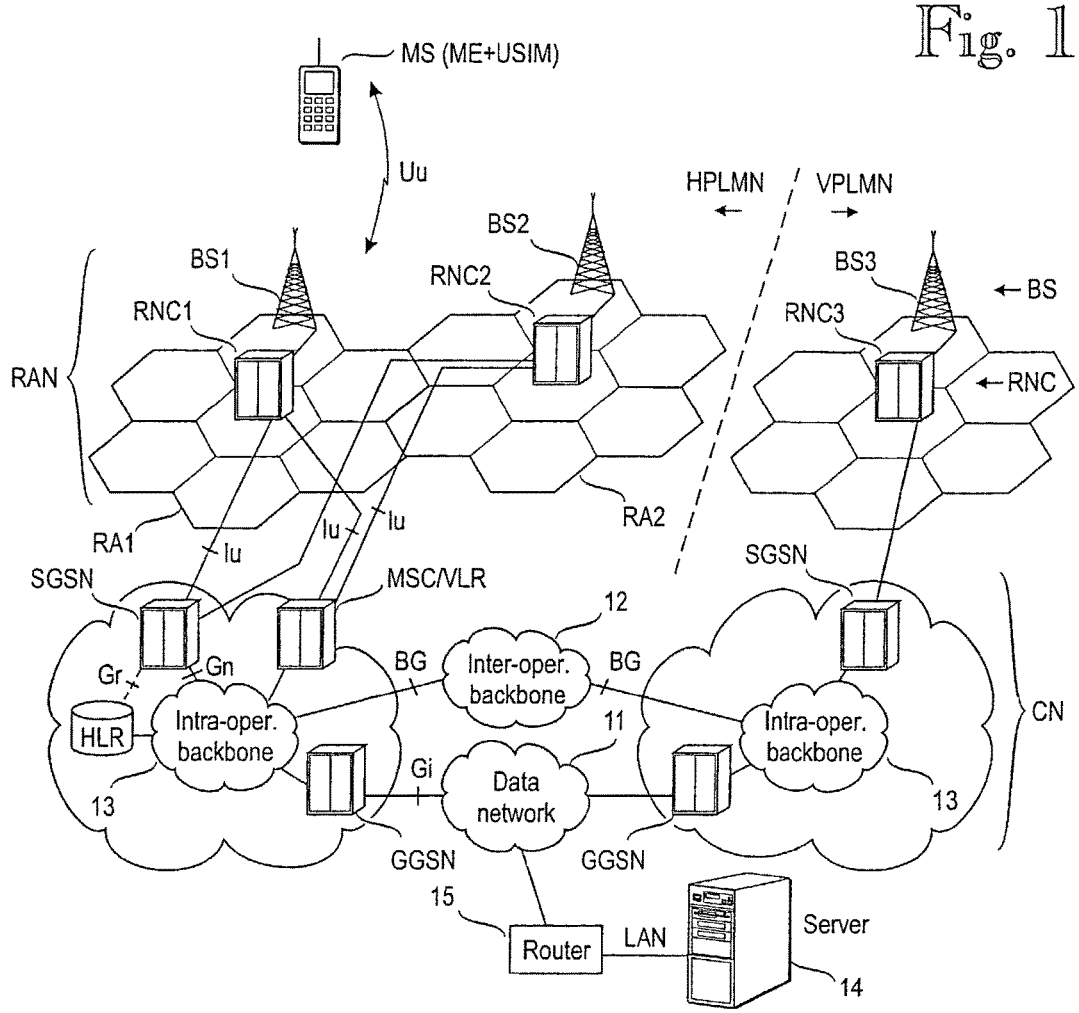
FIG. 1 is a block diagram illustrating one embodiment of the invention.
Figure 2:
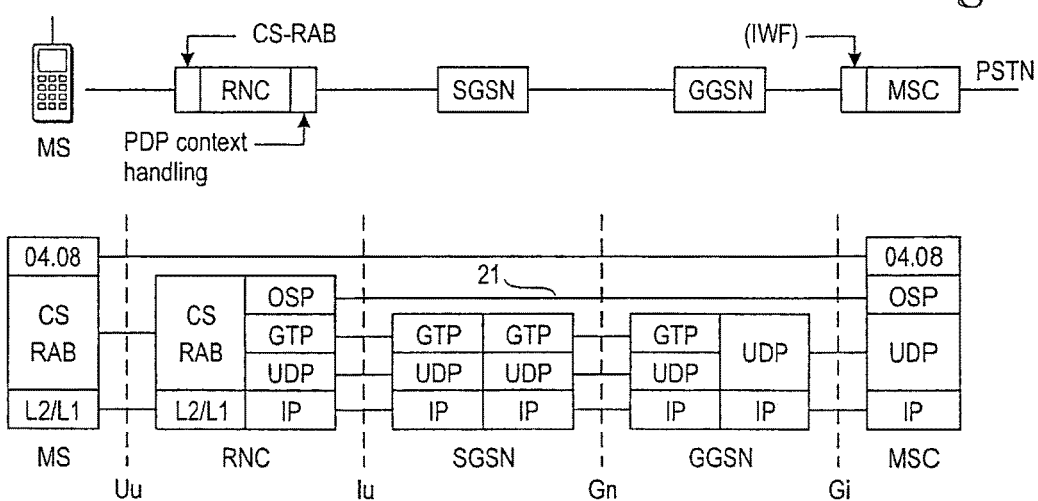
FIG. 2 illustrates tunneling and protocol stacks according to a preferred embodiment of the invention.

FIG. 2 illustrates tunneling and protocol stacks according to a preferred embodiment of the invention. The top half of FIG. 2 shows some of the elements of the telecommunication system shown in FIG. 1, and the bottom half shows the protocol stacks used in the corresponding elements in the top half of the Figure. The embodiment of the invention shown in FIG. 2 makes use of a tunnel 21 between the RNC and the MSC (or any other element which routes circuit-switched connections in the network). The tunnel 21 is built using GTP (GPRS Tunneling Protocol) between the RNC and the GGSN and UDP (User Datagram Protocol) between the GGSN and the MSC. The tunnel 21 conveys IP (Internet protocol) packets between the RNC and the MSC.

FIG. 3 is a signaling diagram illustrating a procedure for opening a signaling PDP context in response to a mobile station's attach procedure in a system as shown in FIGS. 1 and 2. In step 3-2, a mobile station MS initiates an attach procedure by sending the radio network controller RNC an ATTACH REQUEST message. In step 3-4, the RNC detects the attach message and forms a pre-configured PDP (packet data protocol) context. The preconfigured PDP context comprises a field called APN (access point name). This field can be set to '0408', for example. (The value is a mere example, but a value of '0408' suitably indicates that the mobile station uses a GSM protocol defined in ETSI recommendation GSM 04.08 to access the network.) At this stage, the RNC is able to relay the ATTACH REQUEST message to the MSC.

Let us assume that the RNC forms an OSP-type (Octet Stream Protocol) PDP context with an APN value of '0408'. In step 3-6, the RNC sends the SGSN a PDP CONTEXT ACTIVATION request with an APN value of '0408' and a PDP type of 'OSP'. In step 3-8, the SGSN relays these parameters to the GGSN in a CREATE PDP CONTEXT REQUEST message. In step 3-10, the GGSN recognizes the APN value of '0408', set by the RNC. Based on this APN value, the GGSN knows that future messages originating from this PDP context are to be tunneled to the Mobile services Switching Center MSC whose address has been configured in advance. In step 3-12, the GGSN requests the MSC to open a tunnel, and in step 3-14, the MSC acknowledges. In steps 3-16 and 3-18, the GGSN and the SGSN respond to the messages sent in steps 3-8 and 3-6, respectively. Now the RNC knows that a PDP context has been established and a tunnel has been created to the MSC. In step 3-22, the RNC relays the mobile station's ATTACH request to the MSC via the tunnel, and in step 3-24, the MSC responds by sending an ATTACH RESPONSE to the mobile station MS.

FIG. 4 is a signaling diagram illustrating a procedure for opening a real-time PDP context in response to a mobile-originated call request. In step 4-2, the mobile station MS initiates call establishment by sending a SETUP message which the RNC relays to the MSC in step 4-4. In step 4-6, the MSC responds to the SETUP message by sending a CONNECT message which the RNC relays to the mobile station MS in step 4-8. In step 4-10, the RNC detects the CONNECT message from the MSC and, on the basis of it, opens a PDP context for the connection such that the QoS (quality of service) parameters of the PDP context are suitable for conveying speech. (We assume that the call setup relates to a voice call.) The PDP CONTEXT ACTIVATION request is sent to the SGSN in step 4-12, and in step 4-14, the SGSN relays the request to the GGSN. The activation request message's parameters comprise a QoS TFT, or Quality of Service Traffic Flow Template. (A traffic flow template indicates which traffic flow relates to which PDP context. In this case, incoming packets to the mobile station in question should be associated with the PDP context being created now. The QoS preferably indicates a data rate of 64 kilobits per second which corresponds to the data rate of one circuit-switched speech channel.)

In step 4-16, the GGSN opens the requested PDP context and forms a logical connection to the MSC/CSCF. The result of this step is essentially that between the GGSN and the MSC/CSCF, there is now a logical connection able to support the required quality of service. At the MSC/CSCF (or a media gateway connected to it, not shown separately) this logical connection is adapted to PCM/TSL (Pulse-Coded Modulation/Transport Stream Layer) for circuit-switched operations. Alternatively, the MSC/CSCF adapts call control signaling messages to a protocol understood by terminals and call control nodes for packet-switched operations. Examples of such protocols are H.323 and SIP (Session Initiation Protocol). Then, the MSC/CSCF forms a suitable media stream, such as PCM-coded 64 kilobits per second.

In steps 4-18 and 4-20, a response to the PDP Context Activation request is returned to the RNC. In step 4-22, the established PDP context can be used to convey speech packets to the MSC (or to a transcoder (not shown separately) connected to or co-located with the MSC), which is shown as a speech path 4-22 over the MS-to-MSC tunnel.

FIG. 5 is a signaling diagram illustrating a procedure for opening a real-time PDP context in response to a mobile-terminated call request. FIG. 5 is almost similar to FIG. 4. Only the steps and messages relating to call establishment, namely messages 5-2 through 5-8, are reversed. The remaining steps and messages correspond to similarly numbered steps and messages in FIG. 4.

The invention has been described by way of example in connection with a UMTS system. On the basis of the above description, it is easy for one skilled in the art to apply the invention also to other mobile and wired systems. For instance, the invention can be used for establishing a connection between a packet-switched terminal and a circuit-switched switching element. Alternatively, the terminal and switching element may use different circuit-switched or packet-switched protocols. Yet further, the invention is not limited to a radio network but can be used in wired networks comprising an access network and a core network. Accordingly, the invention and its embodiments are not restricted to the above examples, but they can be modified within the scope of the claims.

What is claimed is:

1. A method, comprising:
   establishing a circuit-switched connection between a terminal and an access network node of a wireless access network, wherein the terminal is capable of only circuit-switched operation between the terminal and the wireless access network;
   receiving, at the access network node of the wireless access network and via the circuit-switched connection, a first initiation signal from the terminal, and in response to the first initiation signal, causing a first packet-switched connection for the terminal to be opened between the access network node and a core network node, wherein the first packet-switched connection is a signaling connection, wherein the first packet-switched connection is maintained as long as the terminal is attached to the wireless access network;
   causing transmission, from the access network node, of an activation request including an access point name and a packet data protocol (PDP) type in order to activate a PDP context and to cause a tunnel to the core network node to be created;
   while the first packet-switched connection is active, receiving, at the access network node, a second initiation signal comprising a request to establish a call to or from the terminal, and in response to the second initiation signal, causing a second packet-switched connection for the terminal to be opened between the access network node and the core network node,
   wherein the second packet-switched connection comprises a real-time connection carrying data to or from the terminal, and wherein the second packet-switched connection is maintained for a duration of the call; and
   relaying the data to or from the terminal via the circuit-switched connection.

2. A method, comprising:
   establishing a circuit-switched connection between a terminal and an access network node of a wireless access network and wherein the terminal is capable of only circuit-switched operation between the terminal and the wireless access network;
   receiving, at the access network node of a wireless access network and via the circuit-switched connection, a first initiation signal from the terminal, and in response to the first initiation signal, causing a first packet-switched connection for the terminal to be opened between the access network node and a core network node, wherein the first packet-switched connection is a signaling connection, wherein the first packet-switched connection is maintained as long as the terminal is attached to the wireless access network;

causing transmission, from the access network node, of an activation request including an access point name and a packet data protocol (PDP) type in order to activate a PDP context and to cause a tunnel to the core network node to be created;

receiving, at the access network node, a second initiation signal comprising a request to establish a call to or from the terminal; and in response to the second initiation signal, using the first packet-switched connection to cause a second packet-switched connection for the terminal to be opened between the access network node and the core network node, wherein the second packet-switched connection comprises a real-time connection carrying data to or from the terminal, and wherein the second packet-switched connection is maintained for a duration of the call; and relaying the data to or from the terminal via the circuit-switched connection.

3. The method according to claim 1, wherein causing a second connection to be opened comprises causing, by a processor, the second connection to be opened.

4. The method according to claim 2, wherein using the first connection to cause a second connection to be opened comprises using, by a processor, the first connection to cause the second connection to be opened.

5. The method according to claim 1, wherein the first packet-switched connection comprises a signaling Packet Data Protocol context connection, and wherein the second packet-switched connection comprises a real-time Packet Data Protocol context connection.

6. The method according to claim 1, wherein the first initiation signal comprises an attachment request from the terminal to attach to the wireless access network.

7. An apparatus comprising a radio network controller, the radio network controller configured to:

receive a first initiation signal, via a circuit-switched connection and from a terminal, wherein the terminal is capable of only circuit-switched operation between the terminal and the radio network controller;

in response to the first initiation signal, cause a first packet-switched connection for the terminal to be opened between the radio network controller and a core network node, wherein the first packet-switched connection is a signaling connection, wherein the first packet-switched connection is maintained as long as the terminal is attached to the radio network controller;

cause transmission, from the radio network controller, of an activation request including an access point name and a packet data protocol (PDP) type in order to activate a PDP context and to cause a tunnel to the core network node to be created;

while the first packet-switched connection is active, receive a second initiation signal comprising a request to establish a call to or from the terminal; and in response to the second initiation signal, cause a second packet-switched connection for the terminal to be opened between the radio network controller and the core network node;

wherein the second packet-switched connection comprises a real-time connection to or from the terminal, and wherein the second packet-switched connection is maintained for a duration of the call.

8. The apparatus according to claim 7, wherein the radio network controller comprises a processor configured to cause the radio network to at least:

cause the first packet-switched connection for the terminal to be opened; and cause the second packet-switched connection for the terminal to be opened.

9. The apparatus according to claim 7, wherein the radio network controller comprises a processor and a memory storing computer program code, wherein the memory and stored computer program code are configured, with the at least one processor, to cause the radio network controller to at least:

cause the first packet-switched connection for the terminal of the first type to be opened; and cause the second packet-switched connection for the terminal of the first type to be opened.

10. A method comprising:

sending a first initiation signal from a circuit-switched mobile terminal to a radio network controller, thereby triggering a first packet-switched connection for the mobile terminal to be opened between the radio network controller and a core network node wherein the first packet-switched connection is a signaling connection, wherein the first packet-switched connection is maintained as long as the terminal is attached to the radio network controller and wherein the circuit-switched mobile terminal is capable of only circuit-switched operation between the terminal and the radio network controller;

triggering a transmission, from the radio network controller, of an activation request including an access point name and a packet data protocol (PDP) type in order to activate a PDP context and to cause a tunnel to the core network node to be created; and while the first packet-switched connection is active, sending a second initiation signal from the mobile terminal to the radio network controller, thereby triggering a second packet-switched connection for the mobile terminal to be opened between the radio network controller and the core network node, wherein the second packet-switched connection is maintained for a duration of the call, and wherein the second packet-switched connection comprises a real-time data connection to or from the mobile terminal, the real-time connection being switched by a packet-switched network node.

11. The method according to claim 10, wherein the first initiation signal comprises an attach request.

* * * * *

UNITED STATES PATENT AND TRADEMARK OFFICE
CERTIFICATE OF CORRECTION

PATENT NO. : 9,642,177 B2
APPLICATION NO. : 10/330240
DATED : May 2, 2017
INVENTOR(S) : Soininen et al.

It is certified that error appears in the above-identified patent and that said Letters Patent is hereby corrected as shown below:

On the Title Page

Insert the following item:

--Related U.S. Application Data
(62) Continuation of PCT/FI2001/000620, filed on June 28, 2001.--.

Signed and Sealed this
Thirteenth Day of February, 2018

Andrei Iancu
*Director of the United States Patent and Trademark Office*